US012746974B2

(12) United States Patent
Abe et al.

(10) Patent No.: US 12,746,974 B2
(45) Date of Patent: Sep. 29, 2026

(54) CYLINDRICAL MOUNT

(71) Applicant: Sumitomo Riko Company Limited, Aichi (JP)

(72) Inventors: Junji Abe, Aichi (JP); Tsutomu Matsuoka, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 677 days.

(21) Appl. No.: 18/180,095

(22) Filed: Mar. 7, 2023

(65) Prior Publication Data

US 2023/0339544 A1 Oct. 26, 2023

(30) Foreign Application Priority Data

Apr. 21, 2022 (JP) ................................ 2022-069910

(51) Int. Cl.
*B62D 24/02* (2006.01)
*F16F 15/08* (2006.01)

(52) U.S. Cl.
CPC .............. *B62D 24/02* (2013.01); *F16F 15/08* (2013.01)

(58) Field of Classification Search
CPC ........ F16F 15/08; F16F 1/3863; F16F 1/3835; F16F 1/38; F16F 1/3856; F16F 1/3814;
(Continued)

(56) References Cited

U.S. PATENT DOCUMENTS 4,720,075 A * 1/1988 Peterson .............. B60G 99/004 296/35.1
5,743,509 A * 4/1998 Kanda ........................ F16F 1/38 267/293

(Continued)

FOREIGN PATENT DOCUMENTS

JP S63176156 11/1988
JP H10141437 5/1998

(Continued)

OTHER PUBLICATIONS

"Office Action of China Counterpart Application", issued on Aug. 7, 2025, with English translation thereof, pp. 1-12.

(Continued)

*Primary Examiner* — Robert A. Siconolfi
*Assistant Examiner* — San M Aung
(74) *Attorney, Agent, or Firm* — JCIPRNET

(57) ABSTRACT

In a cylindrical mount in which an inner member and an outer cylindrical member are connected by a main rubber elastic body in a cylindrical shape, the inner member includes a cup member open toward the main rubber elastic body, an end of the main rubber elastic body in an axial direction is inserted and installed to the cup member, a bottom wall of the cup member is superimposed to an end surface of the main rubber elastic body in the axial direction without being bonded, and a circumferential wall of the cup member expands toward an opening side, and, at least in an opening portion, is arranged as a deformation regulation part which has a gap in a state of being separated with respect to the main rubber elastic body toward an outer circumference to be externally inserted.

6 Claims, 4 Drawing Sheets

(58) Field of Classification Search

CPC .. F16F 1/876; F16F 1/376; F16F 1/393; F16F 1/3732; F16F 1/3842; F16F 1/3807; F16F 3/087; F16F 9/535; F16F 13/101; F16F 13/105; F16F 13/108; F16F 224/045; F16F 2230/0047; B62D 24/02; B62D 33/0604; F16C 17/02; F16C 17/10; F16C 25/04; F16C 27/02; F16C 27/063; F16C 2210/04; F16C 2210/06; F16C 33/20; F16C 2326/05; B60K 1/00; B60K 5/1208; B60G 7/005; B60G 99/004; B60G 2204/16; B60G 2204/41; B60G 2204/44

USPC ........................................................ 267/140.13

See application file for complete search history.

(56) References Cited

U.S. PATENT DOCUMENTS

| | | | | |
|---|---|---|---|---|
| 6,030,016 | A * | 2/2000 | Rice | B60G 99/004 296/35.1 |
| 6,030,017 | A * | 2/2000 | Stojkovic | B60G 99/004 296/35.1 |
| 6,523,817 | B1 * | 2/2003 | Landry, Jr. | F16F 1/3732 296/35.1 |
| 7,261,365 | B2 * | 8/2007 | Dickson | B60G 99/002 296/190.07 |
| 7,389,977 | B1 * | 6/2008 | Fernandez | F16F 3/087 267/293 |
| 2002/0121793 | A1 * | 9/2002 | Rice | F16F 15/08 296/35.1 |
| 2006/0083585 | A1 * | 4/2006 | Lew | F16F 1/38 403/365 |
| 2008/0143029 | A1 * | 6/2008 | Sato | F16F 1/38 267/141.1 |

FOREIGN PATENT DOCUMENTS

| | | |
|---|---|---|
| JP | H11311280 | 11/1999 |
| JP | 2000074115 | 3/2000 |
| JP | 2004150596 | 5/2004 |
| JP | 2004291795 | 10/2004 |
| JP | 2013072481 | 4/2013 |
| JP | 2014134260 | 7/2014 |
| JP | 2018071768 | 5/2018 |
| JP | 2021095972 | 6/2021 |
| JP | 2022011825 | 1/2022 |

OTHER PUBLICATIONS

"Notice of Reasons for Refusal of Japan Counterpart Application", issued on Oct. 16, 2025, with English translation thereof, pp. 1-6.

* cited by examiner

CYLINDRICAL MOUNT

CROSS-REFERENCE TO RELATED APPLICATION

This application claims the priority benefit of Japan application serial no. 2022-069910, filed on Apr. 21, 2022. The entirety of the above-mentioned patent application is hereby incorporated by reference herein and made a part of this specification.

BACKGROUND

Technical Field

The disclosure relates to a cylindrical mount suitable for a cab mount, a power unit mount, etc., of an automotive.

Description of Related Art

Conventionally, a cylindrical mount in which an inner member and an outer cylindrical member are connected by a main rubber elastic body in a cylindrical shape is known. For example, Japanese Laid-open No. 2018-071768 (Patent Document 1) has a configuration in which a first installation member having a plate shape and forming the inner member is bonded to an end surface of the cylindrical main rubber elastic body in the axial direction, and a second installation member (outer cylindrical member) is bonded to an outer circumferential surface of the main rubber elastic body.

PRIOR ART DOCUMENTS

Patent Documents

[Patent Document 1] Japanese Laid-open No. 2018-071768

However, in the configuration of Patent Document 1, when a large load is input in an axial direction in which the first installation member is separated from the second installation member, a tensile stress may occur in the main rubber elastic body. Therefore, for example, if it is assumed that a large load is input in the direction in which the first installation member and the second installation member are separated, a higher durability is desired.

In addition, even when a load is input in an approaching direction between the first installation member and the second installation member, for example, it may require a favorable vibration damping property resulting from low spring elasticity at an initial stage in which the input load is smaller, and require a limitation effect (including a stopper effect) on the contraction amount of the main rubber elastic body due to high dynamic spring elasticity at the time when a large load is input, for example. Therefore, regarding the load input in the direction in which the first installation member and the second installation member approach each other, it is favorable to further facilitate the degree of freedom for tuning the properties in accordance with the input load.

SUMMARY

An aspect of the disclosure provides cylindrical mount including: an inner member; an outer cylindrical member; and a main rubber elastic body, in a cylindrical shape, and connecting the inner member and the outer cylindrical member. The inner member comprises a cup member open toward the main rubber elastic body. An end of the main rubber elastic body in an axial direction is inserted and installed to the cup member, a bottom wall of the cup member is superimposed to an end surface of the main rubber elastic body in the axial direction without being bonded. A circumferential wall of the cup member expands toward an opening side, and the circumferential wall, at least in an opening portion, is arranged as a deformation regulation part which has a gap in a state of being separated with respect to the main rubber elastic body toward an outer circumference to be externally inserted.

DESCRIPTION OF THE EMBODIMENTS

Figure 1:
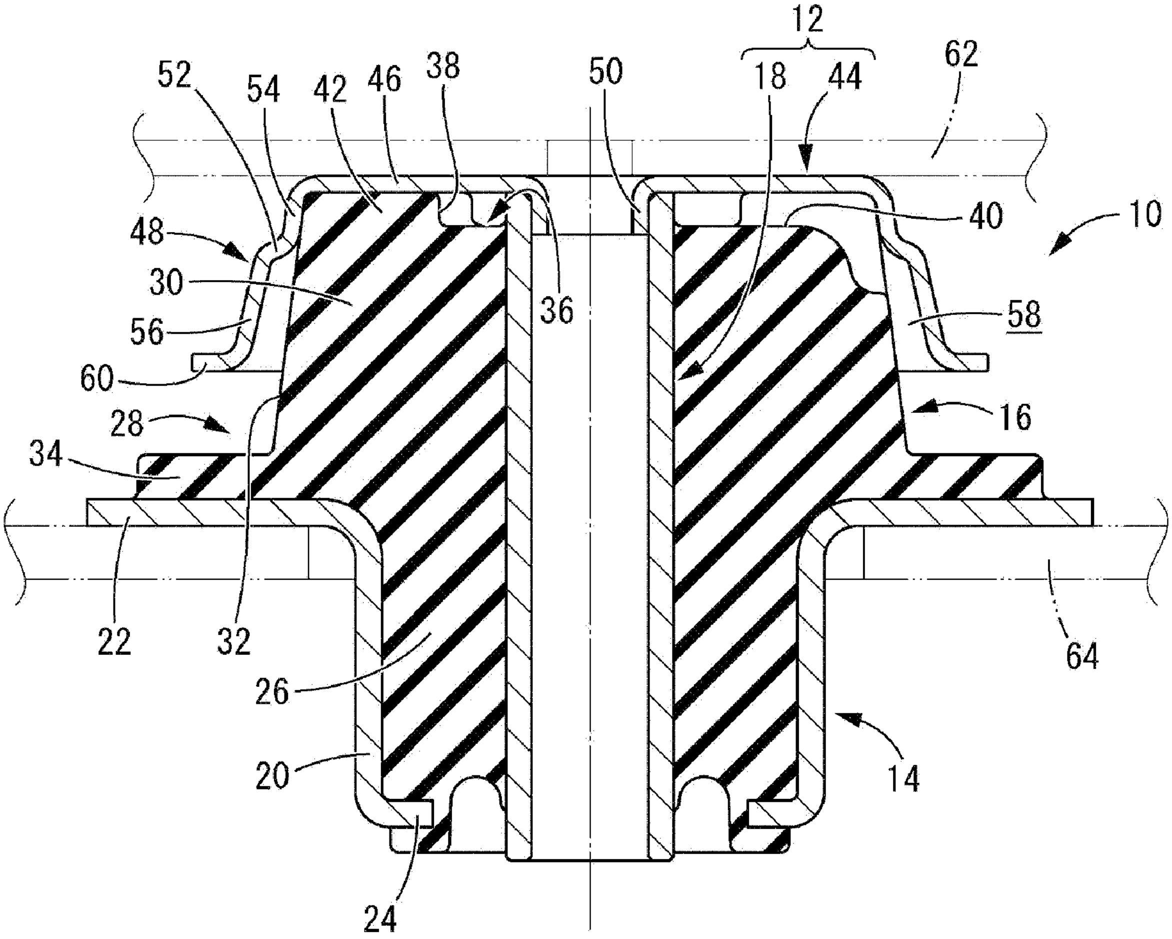
FIG. 1 is a cross-sectional view illustrating a cab mount as a first embodiment of the disclosure, and is equivalent to an I-I cross-section of FIG. 2.

The disclosure provides a cylindrical mount of a novel configuration which facilitates the durability against a large load input toward the separation side of the inner member in the axial direction and the outer cylindrical member and further facilitates the degree of freedom for tuning the properties with respect to the load input toward the approaching side in the axial direction.

Hereinafter, exemplary embodiments for understanding the disclosure will be described, but each embodiment described below is described as an exemplary example, and may be used in combination with each other as appropriate. Multiple components described in each aspect can also be recognized and adopted independently as much as possible, and can also be adopted in combination with any component described in another aspect as appropriate. Accordingly, the disclosure can be implemented in various alternatives without being limited to the embodiments described below.

According to the first aspect, a cylindrical mount includes an inner member, an outer cylindrical member, and a main rubber elastic body in a cylindrical shape. The inner member and the outer cylindrical member are connected by the main rubber elastic body. The inner member includes a cup member open toward the main rubber elastic body. An end of the main rubber elastic body in an axial direction is inserted and installed to the cup member, a bottom wall of the cup member is superimposed to an end surface of the main rubber elastic body in the axial direction without being bonded. A circumferential wall of the cup member expands toward an opening side, and the circumferential wall, at least in an opening portion, is arranged as a deformation regulation part which has a gap in a state of being separated with respect to the main rubber elastic body toward an outer circumference to be externally inserted.

According to the cylindrical mount configured according to the aspect, by arranging the bottom wall of the cup member to be not bonded to the main rubber elastic body, the durability of the main rubber elastic body against an input (tensile input) in the axial direction on the side where the inner member and the outer cylindrical member are separated from each other is facilitated.

By making the circumferential wall of the cup member an expanded shape, the gap with the main rubber elastic body at the bottom side of the circumferential wall is reduced, the deformation of the main rubber elastic body at the bottom side of the circumferential wall is limited, and a suitable initial spring elasticity can be secured. In addition, on the opening side of the circumferential wall, the deformation of the main rubber elastic body is tolerated to a certain extent to obtain the initial low spring elasticity, and the deformation amount of the main rubber elastic body is limited through the abutting of the deformation regulation part. Therefore, two-stage spring properties (low spring elasticity at an initial input stage and high spring elasticity at a late input stage) are realized, and the durability of the main rubber elastic body can be facilitated through a stopper effect.

According to the second aspect, in the cylindrical mount according to the first aspect, the circumferential wall of the cup member is arranged in a stepped cylindrical shape having a step difference in middle, an opening side of the circumferential wall with respect to the step difference is arranged as the deformation regulation part, and a bottom side of the circumferential wall with respect to the step difference is arranged as a proximal part closer to an outer circumferential surface of the main rubber elastic body than the deformation regulation part.

According to the cylindrical mount configured according to the aspect, by using the circumferential wall of the cup member arranged in a stepped cylindrical shape, the initial spring elasticity can be tuned by using the proximal part, and the deformation amount of the main rubber elastic body can be limited by using the deformation regulation part. In addition, with the size of the step difference provided on the circumferential wall of the cup member, the spring tuning can be easily and accurately carried out.

According to the third aspect, in the cylindrical mount according to the first or second aspect, the deformation regulation part of the cup member is arranged in a tapered shape whose diameter increases from a bottom side toward the opening side.

According to the cylindrical mount configured according to the aspect, by making the deformation regulation part of the circumferential wall of the cup member tapered, the cup member can be easily mounted to the main rubber elastic body. In addition, with the tapered angle of the deformation regulation part, the separation distance between the deformation regulation part and the outer circumferential surface of the main rubber elastic body can be regulated.

According to the fourth aspect, in the cylindrical mount according to any one of the first to third aspects, a stopper part in a flange shape protruding toward the outer circumference is provided at an opening end of the cup member, and the stopper part is arranged to face, in the axial direction, an installation plate part installed to the outer cylindrical member.

According to the cylindrical mount configured according to the aspect, in addition to the stopper effect by using the deformation regulation part, since the stopper effect due to the abutting between the stopper part and the installation plate part is also exerted, a multi-stage stopper effect (spring properties) can be obtained.

According to the fifth aspect, in the cylindrical mount according to any one of the first to fourth aspects, the main rubber elastic body is formed with a groove open on an end surface in the axial direction to which the bottom wall of the cup member is superimposed, and an end of the groove is open on an outer circumferential surface of the main rubber elastic body.

According to the cylindrical mount configured according to the aspect, when the cup member and the main rubber elastic body are separated from each other or abut from a state of being separated from each other due to an input in the axial direction, noise can be prevented from occurring.

According to the sixth aspect, in the cylindrical mount according to the fifth aspect, a bottom side end of the circumferential wall is arranged as a mounting part superimposed to the outer circumferential surface of the main rubber elastic body, and a groove depth dimension of the end of the groove open on the outer circumferential surface of the main rubber elastic body is greater than a height dimension of the mounting part in the axial direction.

According to the cylindrical mount configured according to the aspect, the outer circumferential opening of the groove can be prevented from being blocked by the mounting part, and the noise damping effect can be stably obtained.

According to the seventh aspect, in the cylindrical mount according to any one of the first to sixth aspects, a shaft member is bonded to an inner circumferential surface of the main rubber elastic body, and the inner member is configured by fixing the cup member to the shaft member.

According to the cylindrical mount configured according to the aspect, by fixing the cup member with respect to the shaft member bonded to the main rubber elastic body, even if the cup member is installed to the main rubber elastic body without being bonded, the cup member can be prevented from coming off the main rubber elastic body or the position can be prevented from being deviated during transportation or storage, for example.

According to the eighth aspect, in the cylindrical mount according to the seventh aspect, by fixing the cup member to the shaft member, the main rubber elastic body is pre-compressed between the cup member and the outer cylindrical member.

According to the cylindrical mount configured according to the aspect, by fixing the cup member to the shaft member, with the cup member installed to the main rubber elastic body without being bonded, the main rubber elastic body can be pre-compressed. In addition, by pre-compressing the main rubber elastic body, for example, it is difficult to have a separation between the main rubber elastic body and the bottom wall of the cup fitting at the time of a tensile input, and noise is prevented from occurring.

According to the ninth aspect, in the cylindrical mount according to the seventh or eighth aspect, the main rubber elastic body is formed with a groove open on an end surface in the axial direction to which the bottom wall of the cup member is superimposed, and the groove is configured as including: an annular groove part extending in an annular shape around the shaft member; and an outer circumferential groove part extending from the annular groove part toward the outer circumference to open on an outer circumferential surface of the main rubber elastic body.

According to the cylindrical mount configured according to the aspect, with the groove having the annular groove part and the outer circumferential groove part, noise can be effectively prevented from occurring. In addition, in the case where the main rubber elastic body is vulcanized and bonded to the shaft member, by superimposing the die for molding the main rubber elastic body to the shaft member in the annular groove part, the bonding range of the main rubber elastic with respect to the shaft member can be regulated in accordance with the die.

According to the disclosure, the durability against a large load input toward the separation side of the inner member and the outer cylindrical member in the axial direction is facilitated and the degree of freedom for tuning the properties with respect to the load input toward the axial approaching side is further facilitated.

Hereinafter, the embodiments of the disclosure will be described with reference to the drawings.

Figure 2:
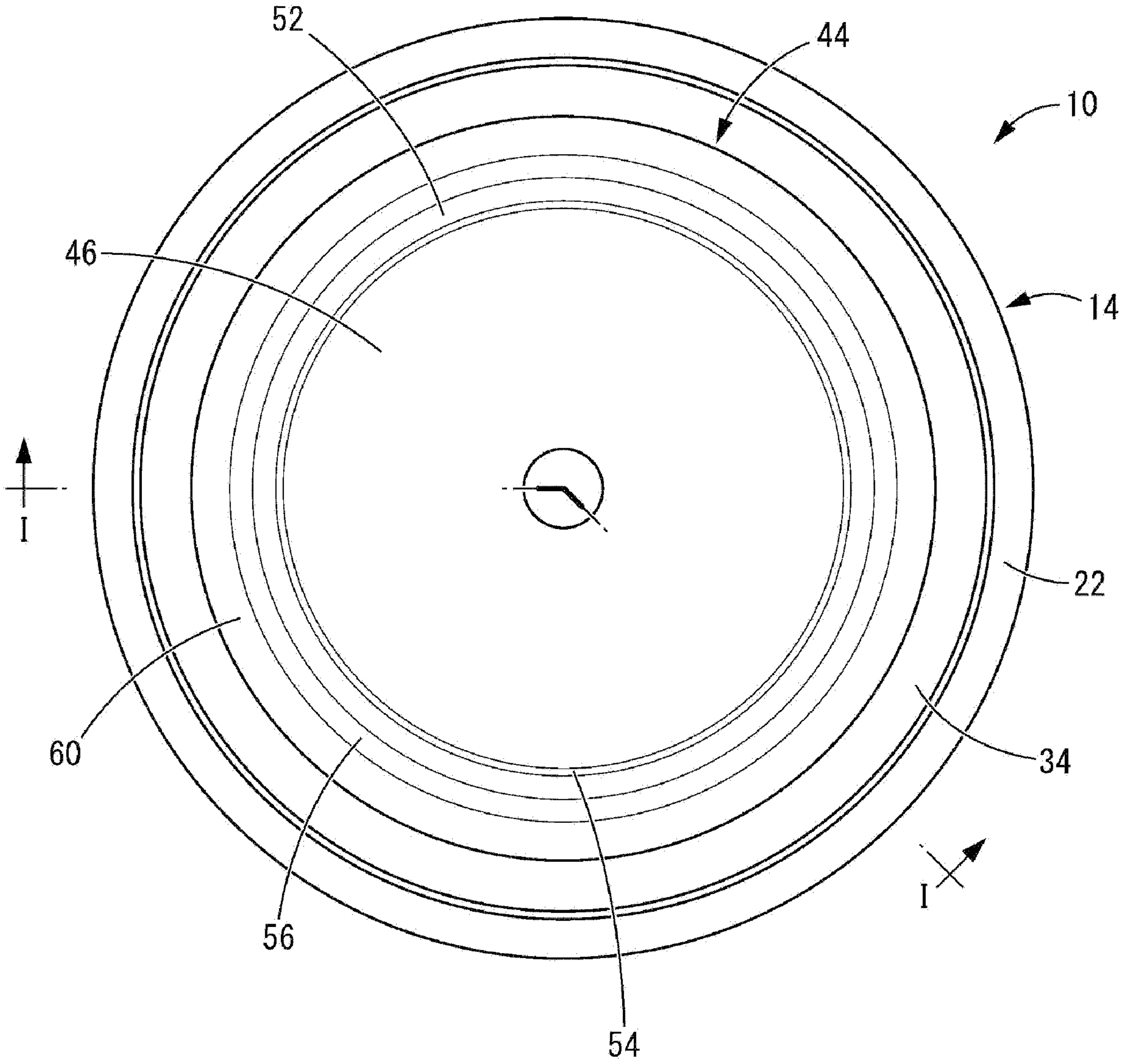
FIG. 2 is a plan view of the cab mount shown in FIG. 1.

FIGS. 1 and 2 illustrate, as the first embodiment of the cylindrical mount configured according to the disclosure, a cab mount 10 for an automotive. The cab mount 10 has a configuration in which a main rubber elastic body 16 is arranged between an inner member 12 and an outer cylindrical member 14. In the following description, in principle, the upper-lower direction refers to the upper-lower direction in FIG. 1, which is a mount axial direction.

The inner member 12 includes a shaft member 18. The shaft member 18 is arranged in a substantially cylindrical shape with a small diameter, and extends linearly in the upper-lower direction. The shaft member 18 is formed by metal, such as iron or aluminum alloys, fiber-reinforced synthetic resin, etc.

The outer cylindrical member 14 is arranged to surround the outer circumference of the shaft member 18. The outer cylindrical member 14 is integrally provided with a cylindrical part 20 in a substantially cylindrical shape and an installation plate part 22 protruding from the upper end of the cylindrical part 20 toward the outer circumference. The cylindrical part 20 is arranged in a substantially cylindrical shape having an inner diameter dimension greater than the outer diameter dimension of the shaft member 18, and an inner flange-shaped part 24 protruding toward the inner circumference is integrally formed at the lower end. In the embodiment, the installation plate part 22 is arranged in a substantially circular plate shape, and is configured to be substantially constant throughout the entire circumference. However, for example, the installation plate part 22 may also include, at multiple positions in the circumferential direction, structures for installation to the vehicle body side, such as stud bolts and bolt holes. In the case where such installation structures are provided, at portions where the installation structures are provided, the installation plate part 22 may partially significantly protrude toward the outer circumference in the circumferential direction. It is noted that the installation plate part 22 of the embodiment merely serves as an example, and may be modified as appropriate in accordance with the installation structure, etc., to the vehicle body. The outer cylindrical member 14 can be obtained, for example, as a press fitting integrally formed by the cylindrical part 20 and the installation plate part 22.

Figure 3:
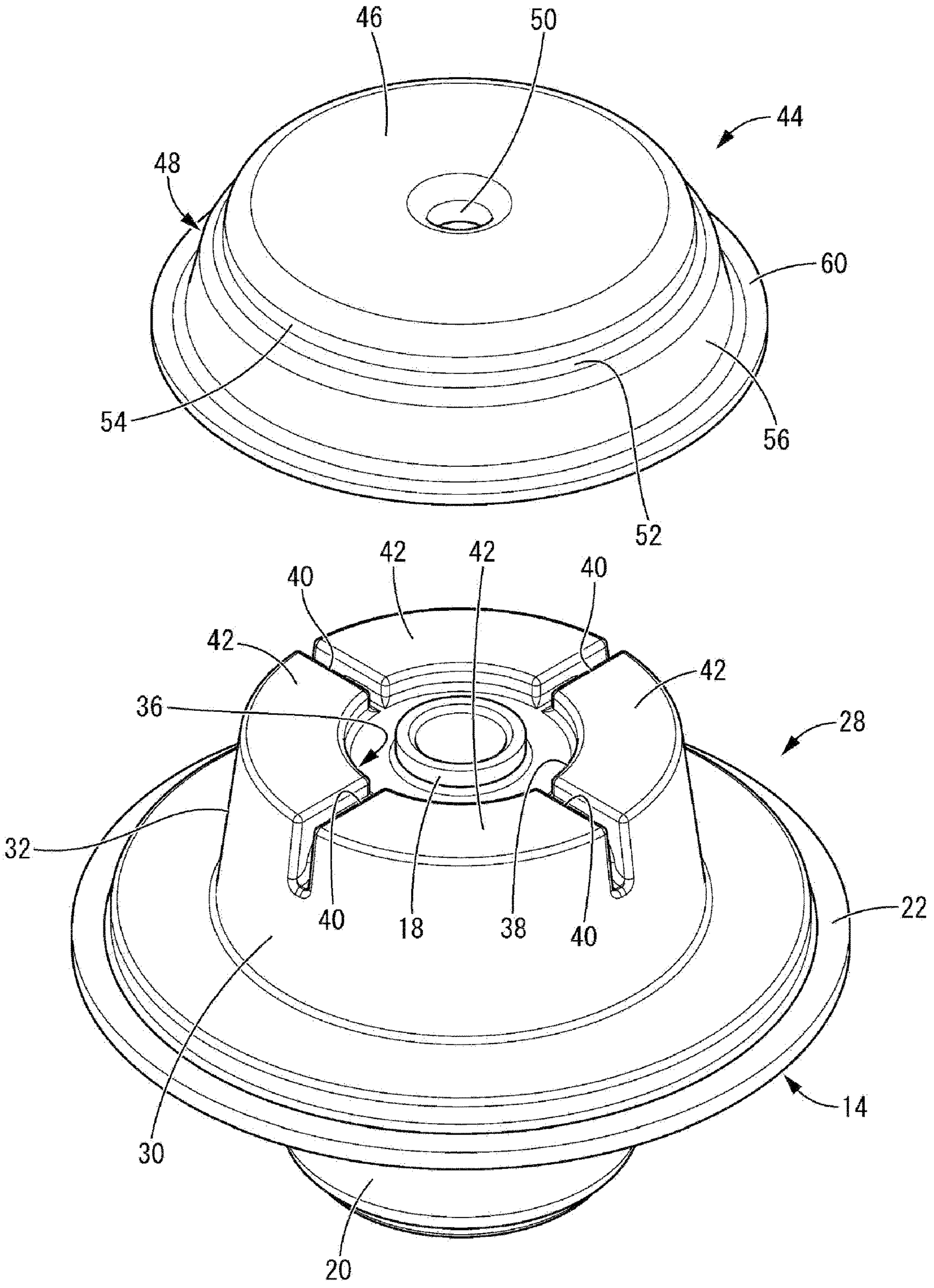
FIG. 3 is an exploded perspective view of the cab mount shown in FIG. 1.

The shaft member 18 is inserted into the outer cylindrical member 14, and the main rubber elastic body 16 is arranged between the shaft member 18 and the outer cylindrical member 14. The entire main rubber elastic body 16 is arranged in a cylindrical shape, the inner circumferential surface of the main rubber elastic body 16 is vulcanized and bonded to the shaft member 18, and the outer circumferential surface of a lower part 26 is vulcanized and bonded to the cylindrical part 20 of the outer cylindrical member 14. As shown in FIG. 3, the main rubber elastic body 16 is arranged as an integrally vulcanized article 28 including the shaft member 18 and the outer cylindrical member 14.

An upper part 30 of the main rubber elastic body 16 located upper of the cylindrical part of the outer cylindrical member 14, and is arranged in a cylindrical shape with a diameter greater than the cylindrical part 20. The outer circumferential surface of the upper part 30 is formed as an inclined outer circumferential surface 32 whose diameter increases downward. Although the inclined outer circumferential surface 32 of the embodiment is linearly inclined at a substantially constant inclined angle, the inclined angle of the inclined outer circumferential surface 32 may change gradiently or in a staged manner in the upper-lower direction. A buffer rubber 34 in an annular plate shape protruding toward the outer circumference is provided at the lower end of the upper part 30. By bonding the buffer rubber 34 to the upper surface of the installation plate part 22, a large bonding area to the outer cylindrical member 14 is secured.

As shown in FIGS. 1 and 3, a groove 36 open on the upper surface is provided at the upper end of the main rubber elastic body 16. The groove 36 is open on the outer circumferential surface of the main rubber elastic body 16. The groove 36 is formed by an annular groove part 38 in which an inner circumferential end of the main rubber elastic body 16 extends in the circumferential direction and four outer circumferential groove parts 40, 40, 40, 40 radially extending from four positions of the annular groove part 38 in the circumferential direction toward the outer circumference.

The annular groove part 38 extends in the circumferential direction around the shaft member 18 arranged on the inner circumference of the main rubber elastic body 16. By providing the annular groove part 38 in the main rubber elastic body 16, the upper end of the shaft member 18 is exposed from the main rubber elastic body 16.

The outer circumferential groove part 40 linearly extends in the radial direction of the main rubber elastic body 16, the inner circumferential side of the outer circumferential groove part is in communication with the annular groove part 38, and the outer circumferential end of the outer circumferential groove part 40 is open on the outer circumferential surface of the main rubber elastic body 16. The depth dimension of the inner circumferential portion of the outer circumferential groove part 40 is substantially the same as the annular groove part 38, and the depth dimension at the outer circumferential end increases. In the embodiment, in the mount single body state before the cab mount 10 is mounted to the vehicle, the depth dimension of the outer circumferential end of the outer circumferential groove part 40 is greater than the distance between a bottom wall 46 and a step difference 52 in the axial direction, and the groove bottom of the outer circumferential end of the outer circumferential groove part 40 is located lower (the opening side of the circumferential wall 48) than the step difference 52 of the circumferential wall 48 in the axial direction. It may also be that, even in a state in which the cab mount 10 to which a support load is input is mounted to a vehicle, the groove bottom of the outer circumferential end of the outer circumferential groove part 40 is located lower than the step difference 52 in the axial direction. The groove width dimension of the outer circumferential groove part 40 is smaller than the groove width dimension of the annular groove part 38.

As shown in FIG. 3, the upper end of the main rubber elastic body 16 includes four upper protrusion parts 42, 42, 42, 42 located on the outer circumferential side of the annular groove part 38 and divided by the four outer circumferential groove parts, 40, 40, 40, 40 in the circumferential direction.

As shown in FIGS. 1 and 3, the upper end of the main rubber elastic body 16, which is an end in the axial direction, is inserted into a cup member 44 forming the inner member 12. The cup member 44 is arranged as a rotation body having a concave cross-section open downward toward the main rubber elastic body 16, and integrally provided with the bottom wall 46 in an annular plate shape and a circumferential wall 48 having a cylindrical shape and protruding downward from the outer circumferential end of the bottom wall 46. The cup member 44, for example, can be obtained by pressing a metal plate.

The bottom wall 46 of the cup member 44 includes a connection cylindrical part 50 protruding downward from the inner edge part. The outer diameter dimension of the connection cylindrical part 50 is slightly greater than the inner diameter dimension of the shaft member 18, and, as shown in FIG. 2, the connection cylindrical part 50 is fixed to the shaft member 18 by being fit to the upper opening part of the shaft member 18. In addition, the cup member 44 is fixed to the shaft member 18, and the inner member 12 is formed by the shaft member 18 and the cup member 44. Moreover, by fixing the cup member 44 to the shaft member 18, the bottom wall 46 of the cup member 44 is pressed against the upper surface of the main rubber elastic body 16 without being bonded, and the main rubber elastic body 16 is pre-compressed in the axial direction between the outer cylindrical member 14 and the cup member 44. By pre-compressing the main rubber elastic body 16, the spring property of the main rubber elastic body 16 is tuned. It is noted that, in at least one of the inner edge part of the upper opening part of the shaft member 18 and the outer edge part of the protrusion tip of the connection cylindrical part 50, chamfering is performed so that the connection cylindrical part 50 is fittable to the shaft member 18.

The circumferential wall 48 of the cup member 44 is arranged in a stepped cylindrical shape having the step difference 52 in the middle of the upper-lower direction, and is arranged in an expanded shape in which the diameter increases toward the opening side. The circumferential wall 48 on the side of the bottom wall 46 with respect to the step difference 52 is arranged as a proximal part 54 with a small diameter, and the circumferential wall 48 on the opening side with respect to the step difference 52 is arranged as a deformation regulation part 56 with a large diameter. The step difference 52 of the embodiment is inclined downward toward the outer circumference, but the step difference 52 may also expand in a substantially an axis right angle direction, for example. The depth position of the step difference 52 in the cup member 44 is adjustable in accordance with the properties as required. In the embodiment, the step difference 52 is provided on the side of the bottom wall 46 with respect to the center in the depth direction of the cup member 44, and the volume of a gap 58 is secured, thereby avoiding excessive deformation suppression of the upper part 30 and securing a non-linear compression deformation region in the axial direction in the main rubber elastic body 16.

The proximal part 54 forms an end on the side of the bottom wall 46 in the circumferential wall 48. The inner diameter dimension of the proximal part 54 is arranged to be substantially the same as the outer diameter dimension of the upper end of the main rubber elastic body 16, and the upper protrusion parts 42, 42, 42, 42 forming the upper end of the main rubber elastic body 16 are inserted into the proximal part 54. In the embodiment, the proximal part 54 is arranged in a tapered shape corresponding to the outer circumferential surface of the upper part 30 of the main rubber elastic body 16, and the outer circumferential surfaces of the upper protrusion parts 42, 42, 42, 42 are superimposed with the inner circumferential surface of the proximal part 54 with substantially zero touch. The proximal part 54 is arranged as a mounting part of the embodiment. The outer circumferential surfaces of the upper protrusion parts 42, 42, 42, 42 may be pressed against and in close contact with the inner circumferential surface of the proximal part 54, and may also be provided with a gap to be separated with respect to the inner circumferential surface of the proximal part 54. The groove depth dimension at the outer circumferential end of the outer circumferential groove part 40 is greater than the height dimension of the proximal part 54 in the axial direction. In a state in which the cup member 44 is mounted to the main rubber elastic body 16, the opening of the outer circumferential groove part 40 on the outer circumferential surface of the main rubber elastic body 16 is open on the inner circumference of the deformation regulation part 56 lower than the proximal part 54.

The deformation regulation part 56 forms an end on the opening side in the circumferential wall 48. The inner diameter dimension of the deformation regulation part 56 is greater than the outer diameter dimension of the upper part 30 of the main rubber elastic body 16, and is arranged in an externally inserted state away from the upper part 30 of the main rubber elastic body 16 on the outer circumferential side. The gap 58 is formed between the deformation regulation part 56 and the main rubber elastic body 16. The proximal part 54 is arranged to be closer to the outer circumferential surface of the upper part 30 of the main rubber elastic body 16 than the deformation regulation part 56. The deformation regulation part 56 integrally extends downward from the outer circumferential end of the step difference 52. The deformation regulation part 56 is arranged in a tapered cylindrical shape where the diameter increases from the side of the bottom wall 46 toward the lower opening side. A flange-shaped stopper part 60 protruding toward the outer circumference is integrally formed at the lower end of the deformation regulation part 56 forming the opening end of the cup member 44. The stopper part 60 expands in the axis right angle direction, and is arranged to face, from the top, the installation plate part 22 of the outer cylindrical member 14. The stopper part 60 is arranged above and apart with respect to the buffer rubber 34 bonded to the installation plate part 22.

In the cab mount 10 having the configuration in which the cup member 44 is installed to the integrally vulcanized article 28, for example, the inner member 12 is installed to a cabin 62 of the automotive superimposed to the upper surface of the bottom wall 46 of the cup member 44 by using an installation bolt not shown herein and inserted through the inner member 12. In addition, in the outer cylindrical member 14, the installation plate part 22 is installed to a frame 64 of the automotive by using the installation configuration not shown herein. Accordingly, the cab mount is interposed between the cabin 62 and the frame 64 of the automotive, and the cabin 62 is in vibration damping connection with the frame 64.

When a load (tensile load) in the direction in which the cabin 62 and the frame 64 are separated from each other is input to the cab mount 10, the cup member 44 of the inner member 12 and the outer cylindrical member 14 of the cab mount 10 are separated and displaced from each other in the axial direction. Since the cup member 44 is attached to the main rubber elastic body 16 without being bonded, the cup member 44 is relatively displaceable upward with respect to the main rubber elastic body 16. Therefore, the tensile load in the axial direction is not input to the main rubber elastic body 16, and the durability of the main rubber elastic body 16 is facilitated.

In the embodiment, by fixing the cup member 44 to the shaft member 18, the main rubber elastic body 16 is pre-compressed in the axial direction. Therefore, when a tensile load is input, it is difficult to separate the bottom wall 46 of the cup member 44 from the upper surface of the main rubber elastic body 16. Thus, even if a compression load is input after a tensile load is input, the bottom wall 46 of the cup member 44 does not hit the upper surface of the main rubber elastic body 16 from the separated state, and a hitting sound is prevented.

When a load in the direction in which the cabin 62 and the frame 64 approach each other is input to the cab mount 10, the cup member 44 of the inner member 12 and the outer cylindrical member 14 of the cab mount 10 approach and are displaced to each other in the axial direction. Accordingly, the main rubber elastic body 16 is compressed in the axial direction to exert a vibration damping effect, such as a vibration attenuation effect, based on the internal friction, etc., of the main rubber elastic body 16.

In the case where the input load of the compression direction is large, the compression deformation amount of the main rubber elastic body 16 is limited by a stopper mechanism. The cab mount 10 has a first stopper mechanism and a second stopper mechanism, and exerts a stopper effect in a staged manner.

Figure 4:
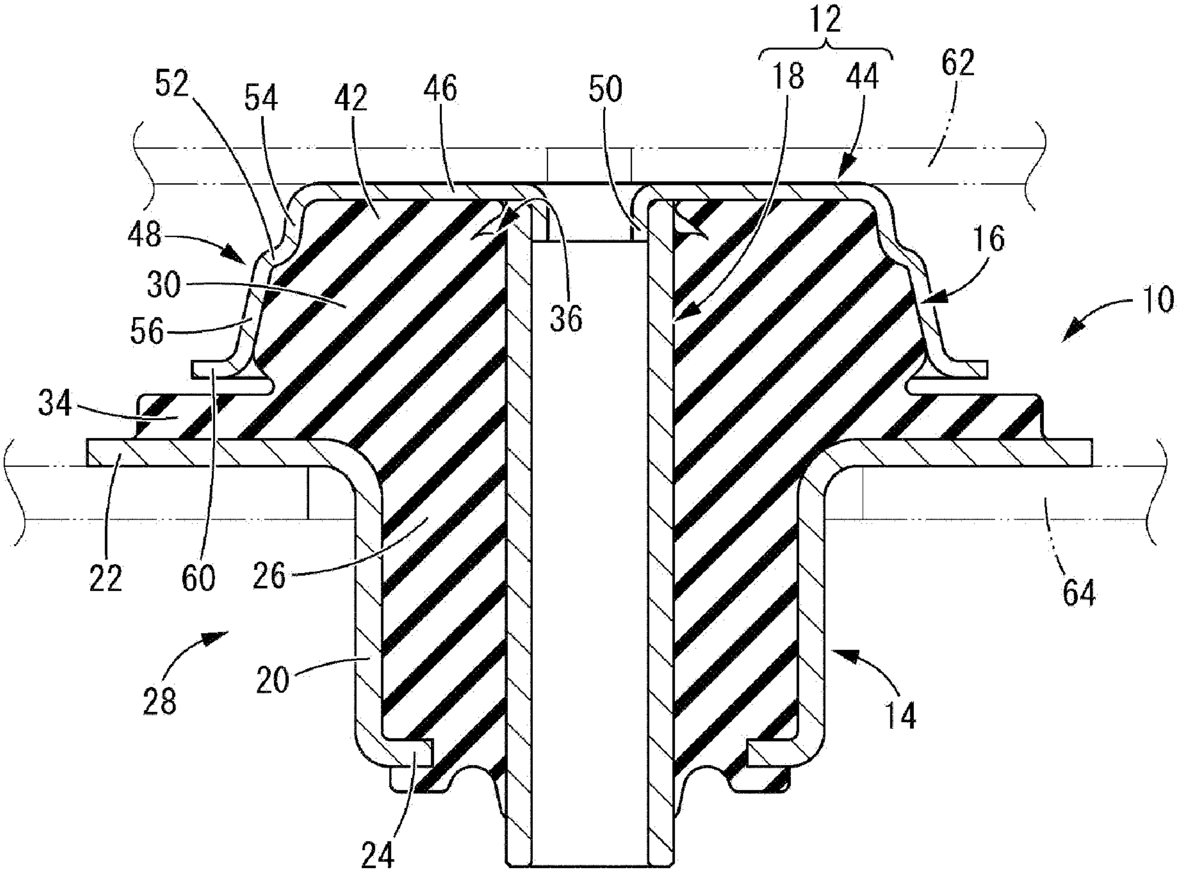
FIG. 4 is a vertical cross-sectional view illustrating a state in which a compression load in an axial direction is input to the cab mount shown in FIG. 1.

The first stopper mechanism is configured by abutting the outer circumferential surface of the upper part 30 of the main rubber elastic body 16 against the deformation regulation part 56 of the circumferential wall 48 of the cup member 44. That is, when the main rubber elastic body 16 is compressed in the axial direction, an expansion deformation in the axis right angle direction occurs based on Poisson's ratio. However, since the inner circumferential surface of the main rubber elastic body 16 is limited by the shaft member 18, the outer circumferential surface of the upper part 30 arranged as a free surface is deformed to expand toward the gap 58 on the outer circumferential side. In the upper part 30 of the main rubber elastic body 16 which expands and deforms toward the outer circumference to bury the gap 58, as shown in FIG. 4, the expansion deformation amount toward the outer circumferential side is limited as the outer circumferential surface abuts against and is limited by the deformation regulation part 56 of the cup member 44. As a result, the compression spring of the main rubber elastic body 16 in the axial direction hardens, and a stopper effect that limits the compression deformation amount of the main rubber elastic body 16 in the axial direction is exerted. In the upper part 30 of the main rubber elastic body 16, as the expansion deformation amount toward the outer circumferential side increases, the abutting area against the deformation regulation part 56 increases, and the compression spring of the main rubber elastic body 16 in the axial direction hardens. Therefore, the stopper effect of the first stopper mechanism limiting the compression deformation of the main rubber elastic body 16 in the axial direction is exhibited strongly.

The circumferential wall 48 of the cup member 44 is arranged in a shape expanding toward the opening side, and the deformation regulation part 56 forming the opening portion of the circumferential wall 48 is arranged with respect to the main rubber elastic body 16, with the gap 58 being interposed. Therefore, at the deformation initial stage in which the compression deformation amount of the main rubber elastic body 16 is small, the outer circumferential surface of the upper part 30 of the main rubber elastic body 16 is arranged as a free surface separated from the circumferential wall 48 of the cup member 44 toward the inner circumference on the lower side with respect to the upper protrusion parts 42 to exert a vibration damping effect due to low spring elasticity of the main rubber elastic body 16. Meanwhile, when the compression deformation amount of the main rubber elastic body 16 increases, the outer circumferential surface of the upper part 30 of the main rubber elastic body 16 abuts against and is limited by the circumferential wall 48 of the cup member 44 on the lower side with respect to the upper protrusion part 42, so a stopper effect is exerted. In this way, the spring property of the main rubber elastic body 16 is adjusted in accordance with the magnitude of the input compression load, and the desired vibration damping property and durability property can both be realized.

The second stopper mechanism is configured by abutting against the installation plate part 22 of the outer cylindrical member 14 against the stopper part 60 of the cup member 44. That is, when the main rubber elastic body 16 is compressed and deformed in the axial direction, the cup member 44 approaches the outer cylindrical member 14 in the axial direction. Therefore, when the compression deformation amount of the main rubber elastic body 16 increases, the installation plate part 22 of the outer cylindrical member 14 abuts against the stopper part 60 of the cup member 44 via the buffer rubber 34. Accordingly, the approaching displacement of the outer cylindrical member 14 and the cup member 44 is limited, and a stopper effect that limits the compression deformation amount of the main rubber elastic body 16 in the axial direction is exerted.

In the embodiment, compared with the stopper effect of the second stopper mechanism, the stopper effect of the first stopper mechanism is exerted at a stage in which the compression deformation amount of the main rubber elastic body 16 is small. Accordingly, with the stopper effect of the first stopper mechanism and the stopper effect of the second stopper mechanism being exerted in a staged manner, it is possible to secure the durability of the main rubber elastic body 16 by effectively limiting the compression deformation amount of the main rubber elastic body 16 while realizing a favorable ride by preventing a shock feeling due to a drastic change of spring properties.

Since the cup member 44 is installed to the main rubber elastic body 16 without being bonded, if a load on the compression side in the axial direction is input, when the bottom wall 46 of the cup member 44 is pressed against the upper surface of the main rubber elastic body 16, there is a concern that noise due to close contact of the bottom wall 46 and the upper surface of the main rubber elastic body 16 may occur. Therefore, in the embodiment, the annular groove part 38 and the outer circumferential groove parts 40 open on the upper surface of the main rubber elastic body 16 are formed. The upper surface of the main rubber elastic body 16 is divided into four, and continuous abutting in a wide range between the bottom wall 46 and the upper surface of the main rubber elastic body 16 is prevented. Accordingly, the noise when the bottom wall 46 of the cup member 44 and the upper surface of the main rubber elastic body 16 are in close contact is prevented.

Moreover, in the configuration in which the cup member 44 and the main rubber elastic body 16 are not bonded, although noise may occur when the bottom wall 46 of the cup member 44 and the upper surface of the main rubber elastic body 16 are separated from the close contact state, by forming the groove 36 open on the upper surface of the main rubber elastic body 16 to open on the outer circumferential surface of the main rubber elastic body 16, the noise at the time of separation is also prevented.

Although the embodiments of the disclosure have been described in detail above, the disclosure is not limited by the detailed descriptions. For example, in the circumferential wall 48 of the cup member 44 in the embodiment, the diameter of the opening side with respect to the step difference is larger than the side of the bottom wall 46, and the circumferential wall 48 is arranged in a tapered cylindrical shape whose diameter increases toward the opening. However, the step difference 52 and the tapered shape are not both required, as long as the circumferential wall of the cup member is arranged in an expanded shape with a large diameter on the opening side. In brief, for example, in the circumferential wall of the cup member, the deformation regulation part may extend in the axial direction with a substantially constant diameter dimension if the step difference is provided, or the circumferential wall of the cup member may also have a configuration arranged in a tapered cylindrical shape in which the diameter of the deformation regulation part increases toward the opening without step difference. Considering a non-linear property, etc., as required, for example, step differences 52 whose inclined angles are greater than other portions of the circumferential wall may also be provided at multiple positions of the sidewall in the axial direction.

The inner member may also be without the shaft member 18, and may also be configured by only the cup member 44. In such case, the installation bolt, etc., inserted into the inner circumference of the main rubber elastic body 16 may also include at least a portion of the functions of the shaft member 18, such as limiting the expansion deformation of the main rubber elastic body 16 toward the inner circumferential side.

The connection configuration between the shaft member 18 and the cup member 44 is not particularly limited. For example, the shaft member 18 may be pressed into and fixed to the central hole of the bottom wall 46 of the cup member 44, or the inner edge part of the bottom wall 46 may be crimped and fixed to the end of the shaft member 18 in the axial direction.

The upper end portion of the main rubber elastic body 16 may be pressed with respect to the proximal part 54 of the cup member 44, may also contact the proximal part 54 without being pressed, and may also be separated toward the inner circumferential side of the proximal part 54. In such case, a gap is also provided between the upper part 30 of the main rubber elastic part 16 and the proximal part 54 in addition to the gap between the upper part 30 of the main rubber elastic body 16 and the deformation regulation part 56 in the circumferential wall 48 of the cup member 44. In such gap, the radial dimension in the inner circumference of the proximal part 54 is smaller than the radial dimension in the inner circumference of the deformation regulation part 56. In addition, for example, when a support load, such as the cabin 62, is input to the cylindrical mount in a vehicle mounted state, through the elastic deformation of the upper part 30 of the main rubber elastic body 16, the upper part 30 of the main rubber elastic body 16 may also abut against the proximal part 54. In this way, in the case where the entire circumferential wall 48 is separated with respect to the main rubber elastic body 16 toward the outer circumference, by making the separation distance between the circumferential wall 48 and the main rubber elastic body 16 different on the side of the bottom wall 46 and on the opening side, a soft spring property with respect to a small input load and a hard spring property with respect to a large input load are both realized.

For example, the gap 58 is formed continuously in a substantially constant size throughout the entire circumference in the embodiment. However, considering the vibration damping property, the load property, etc., as required, the size of the gap 58 may be different in the circumferential direction. In the case where different load-spring properties are required in two directions of the axis right angle direction, which are the vehicle front-rear direction and the vehicle left-right direction, for example, the outer circumferential shape of the upper part 30 may be arranged as elliptical, the circumferential wall 48 is arranged as elliptical, etc., and the size of the gap 58 in the radial direction may differ in the axis right angle direction. For example, there may be substantially no gap 58 or step difference 52 in one direction of the axis right angle direction.

The groove 36 of the embodiment is formed by the annular groove part 38 extending in the circumferential direction and the outer circumferential groove parts 40 extending radially in the radial direction. However, it suffices as long as the groove is open on the outer circumferential surface of the main rubber elastic body 16. For example, the groove may be formed by a groove part extending in the axis right angle direction.

The cylindrical mount according to the disclosure is applicable not only to a cab mount, but also to a power unit mount, etc., connecting a power unit such as an engine, a motor, etc. to a vehicle body for vibration damping.

What is claimed is:

1. A cylindrical mount, comprising:
an inner member;
an outer cylindrical member; and
a main rubber elastic body, in a cylindrical shape, and connecting the inner member and the outer cylindrical member,
wherein the inner member comprises a cup member open toward the main rubber elastic body,
an end of the main rubber elastic body in an axial direction is inserted and installed to the cup member, a bottom wall of the cup member is superimposed to an end surface of the main rubber elastic body in the axial direction without being bonded, and
a circumferential wall of the cup member expands toward an opening side, and the circumferential wall, at least in an opening portion, is arranged as a deformation regulation part which has a gap in a state of being separated with respect to the main rubber elastic body toward an outer circumference to be externally inserted,
wherein the circumferential wall of the cup member is arranged in a stepped cylindrical shape having a step difference in middle,
an opening side of the circumferential wall with respect to the step difference is arranged as the deformation regulation part, and
a bottom side of the circumferential wall with respect to the step difference is arranged as a proximal part closer to an outer circumferential surface of the main rubber elastic body than the deformation regulation part,
wherein the main rubber elastic body is formed with a groove open on an end surface in the axial direction to which the bottom wall of the cup member is superimposed, and an end of the groove is open on the outer circumferential surface of the main rubber elastic body,
wherein a bottom side end of the circumferential wall is arranged as a mounting part superimposed to the outer circumferential surface of the main rubber elastic body, and
a groove depth dimension of the end of the groove open on the outer circumferential surface of the main rubber elastic body is greater than a height dimension of the mounting part in the axial direction.

2. The cylindrical mount as claimed in claim 1, wherein the deformation regulation part of the cup member is arranged in a tapered shape whose diameter increases from a bottom side toward the opening side.

3. The cylindrical mount as claimed in claim 1, wherein a stopper part in a flange shape protruding toward the outer circumference is provided at an opening end of the cup member, and the stopper part is arranged to face, in the axial direction, an installation plate part installed to the outer cylindrical member.

4. The cylindrical mount as claimed in claim 1, wherein a shaft member is bonded to an inner circumferential surface of the main rubber elastic body, and the inner member is configured by fixing the cup member to the shaft member.

5. The cylindrical mount as claimed in claim 4, wherein by fixing the cup member to the shaft member, the main rubber elastic body is pre-compressed between the cup member and the outer cylindrical member.

6. The cylindrical mount as claimed in claim 4, wherein the groove is configured as comprising: an annular groove part extending in an annular shape around the shaft member; and an outer circumferential groove part extending from the annular groove part toward the outer circumference to open on the outer circumferential surface of the main rubber elastic body.

* * * * *